United States Patent
Samuels et al.

(10) Patent No.: US 8,477,505 B2
(45) Date of Patent: Jul. 2, 2013

(54) PERIPHERAL DEVICE WITH LIMITED RELATIVE ANGULAR MOVEMENT

(75) Inventors: Bruce Richard John Samuels, Vancouver (CA); Mark Andrew Timmerman, Vancouver (CA); Edwin Sy Liu, Richmond (CA)

(73) Assignee: NETGEAR, Inc., San Jose, CA (US)

( * ) Notice: Subject to any disclaimer, the term of this patent is extended or adjusted under 35 U.S.C. 154(b) by 214 days.

(21) Appl. No.: 12/890,966

(22) Filed: Sep. 27, 2010

(65) Prior Publication Data

US 2011/0235253 A1 Sep. 29, 2011

Related U.S. Application Data

(60) Provisional application No. 61/246,890, filed on Sep. 29, 2009.

(51) Int. Cl.
*H05K 7/00* (2006.01)

(52) U.S. Cl.
USPC ............. 361/728; 361/725; 16/50; 16/221; 16/223; 16/280; 16/317; 16/330; 16/334; 16/337; 16/341; 16/348; 16/367; 439/11; 439/373; 439/640; 455/575.1; 455/575.3; 348/335; 348/375

(58) Field of Classification Search
USPC ............. 361/728, 725; 16/50, 221, 223, 280, 16/317, 330, 334, 337, 341, 348, 367; 439/11, 439/373, 640; 455/575.1, 575.3; 348/335, 348/375
See application file for complete search history.

(56) References Cited

U.S. PATENT DOCUMENTS

| | | | |
|---|---|---|---|
| 2,241,506 A | 5/1941 | Eppler | |
| 4,037,978 A * | 7/1977 | Connelly | ...................... 403/164 |
| 4,101,227 A | 7/1978 | Herbenar | |
| 5,333,356 A | 8/1994 | Katagiri | |
| 5,369,842 A * | 12/1994 | Beatty | .............................. 16/317 |
| 5,484,220 A | 1/1996 | Lewis | |
| 5,529,421 A | 6/1996 | Epkens | |
| 5,685,661 A | 11/1997 | Marka | |
| 5,697,124 A * | 12/1997 | Jung | ................................. 16/341 |
| 5,772,350 A | 6/1998 | Ferguson | |
| 5,781,409 A | 7/1998 | Mecredy, III | |

(Continued)

OTHER PUBLICATIONS

Digadget web page, "USB HSDPA Modem," www.digadget.com/.../usb-hasdpa-modem/, Jan. 2009.

(Continued)

*Primary Examiner* — Xiaoliang Chen
(74) *Attorney, Agent, or Firm* — Boyle Fredrickson, S.C.

(57) ABSTRACT

The present invention provides a peripheral device with limited relative angular movement. The peripheral device is configured for detachable operative interconnection with a computing device and comprises a first portion, a second portion, and an operatively connected peripheral device component. The first portion includes a first hinge portion, which defines an axis of rotation, and comprises a first protrusion and a second protrusion. The first protrusion is disposed axially separated at a predetermined distance from the second protrusion. The second portion includes a second hinge portion, which is operatively interconnected with the first hinge portion to allow the first portion and the second portion to rotate relative to one another about the axis of rotation between a first angle and a second angle. The peripheral device component provides one or more peripheral device functions. The first angle and the second angle at least in part are defined by the first protrusion and the second protrusion.

21 Claims, 7 Drawing Sheets

U.S. PATENT DOCUMENTS

| | | | |
|---|---|---|---|
| 5,839,846 A | 11/1998 | Shimada | |
| 5,905,796 A * | 5/1999 | Jung | 379/433.13 |
| 6,085,387 A * | 7/2000 | Han | 16/330 |
| 6,142,535 A | 11/2000 | Nishio | |
| 6,226,177 B1 | 5/2001 | Rude | |
| 6,334,632 B1 | 1/2002 | Nishio | |
| 6,375,487 B1 * | 4/2002 | Tennessen | 439/373 |
| 6,457,207 B1 * | 10/2002 | Horberg | 16/50 |
| 6,544,075 B1 | 4/2003 | Liao | |
| 6,551,142 B2 | 4/2003 | Eisenbraun | |
| 6,612,874 B1 * | 9/2003 | Stout et al. | 439/640 |
| 6,786,734 B2 | 9/2004 | Yu | |
| 7,094,078 B2 | 8/2006 | Okada | |
| 7,113,812 B2 | 9/2006 | Li | |
| 7,172,428 B2 * | 2/2007 | Huang | 439/11 |
| 7,173,825 B2 * | 2/2007 | Han et al. | 361/725 |
| 7,435,090 B1 * | 10/2008 | Schriefer et al. | 439/13 |
| 7,443,439 B2 * | 10/2008 | Kim et al. | 348/335 |
| 7,528,886 B2 * | 5/2009 | Yang | 348/375 |
| 7,600,298 B2 * | 10/2009 | Chen et al. | 16/367 |
| 2002/0187818 A1 * | 12/2002 | Kang | 455/575 |
| 2004/0049884 A1 * | 3/2004 | Kim | 16/337 |
| 2004/0137970 A1 * | 7/2004 | Han | 455/575.3 |
| 2004/0200038 A1 * | 10/2004 | Kim | 16/367 |
| 2004/0223080 A1 * | 11/2004 | Kim | 348/375 |
| 2004/0229478 A1 | 11/2004 | Chen | |
| 2005/0200740 A1 * | 9/2005 | Kim et al. | 348/335 |
| 2006/0037175 A1 * | 2/2006 | Hyun | 16/221 |
| 2006/0044747 A1 | 3/2006 | Chen | |
| 2006/0050867 A1 * | 3/2006 | Kawamoto | 379/433.13 |
| 2007/0277348 A1 | 12/2007 | Schluter | |
| 2008/0040887 A1 | 2/2008 | Dickerson | |
| 2008/0078056 A1 * | 4/2008 | Hsu et al. | 16/280 |
| 2008/0120809 A1 | 5/2008 | Nakasone | |
| 2008/0209632 A1 | 9/2008 | Presnell | |
| 2009/0070958 A1 | 3/2009 | Chien | |
| 2009/0208274 A1 | 8/2009 | Liang | |
| 2009/0320239 A1 * | 12/2009 | Keranen et al. | 16/223 |
| 2010/0011539 A1 * | 1/2010 | Huang et al. | 16/367 |
| 2010/0095486 A1 * | 4/2010 | Chou | 16/348 |

OTHER PUBLICATIONS

PCMAG.com web page, "Verizon Wireless UM150," www.pcmag.com/.../0,2817,2249881,00.asp, Jan. 2009.

"Verizon's UM150 USB EVDO Rev-A Modem—First Impressions," Nov. 2007, 7 pages, EVDOinfo.com, www.evdoinfo.com/content/view/2161/64/.

* cited by examiner

PERIPHERAL DEVICE WITH LIMITED RELATIVE ANGULAR MOVEMENT

CROSS-REFERENCE TO RELATED ACTIONS

This application claims the benefit of U.S. Provisional Application No. 61/246,890 filed on Sep. 29, 2009.

FIELD OF THE INVENTION

The present invention pertains in general to peripheral devices that can be interconnected with a computing device and in particular to aspects of limiting relative angular movement of a peripheral device.

BACKGROUND

Peripheral devices can be used to expand the functionality of computing devices such as personal, notebook and mobile computers, handheld communication devices and so forth and provide additional, complementary or redundant functionality. For example, peripheral devices can establish wireless communication links with other peripheral or computing devices. A peripheral device may be detachably operatively connected with a computing device via a predetermined interconnect system. Typical interconnect systems used in wireless adapters are based on universal serial bus (USB™), PC Card™ (PCMCIA™), ExpressCard™ etc.

One type of peripheral device includes a wireless network interface adapter, commonly referred to as a wireless adapter that provides a computing device with the ability to send and receive data from external sources. In order to improve reception and to better direct signals emitted from a wireless adapter, rotary and/or articulated peripheral devices have been developed. U.S. Pat. Nos. 7,113,812, 7,172,428, 7,435,090, 6,544,075, 6,612,874 and 6,786,734, as well as United States Patent Application Publication No. 2004/0229478 provide examples of such wireless adapters. The mechanisms for rotational adjustment that are taught in these references, however, are fragile and typically provide unreliable angular retention. Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a peripheral device with limited angular movement. In accordance with one aspect of the present invention, there is provided a peripheral device configured for detachable operative interconnection with a computing device, the peripheral device comprising: a first portion including a first hinge portion, which defines an axis of rotation, and comprises a first protrusion and a second protrusion, the first protrusion disposed axially separated at a predetermined distance from the second protrusion; a second portion including a second hinge portion which is operatively interconnected with the first hinge portion to allow the first portion and the second portion to rotate relative to one another about the axis of rotation between a first angle and a second angle; said first angle and said second angle at least in part defined by said first protrusion and said second protrusion; and an operatively connected peripheral device component.

DETAILED DESCRIPTION OF THE INVENTION

Definitions

Figure 1:
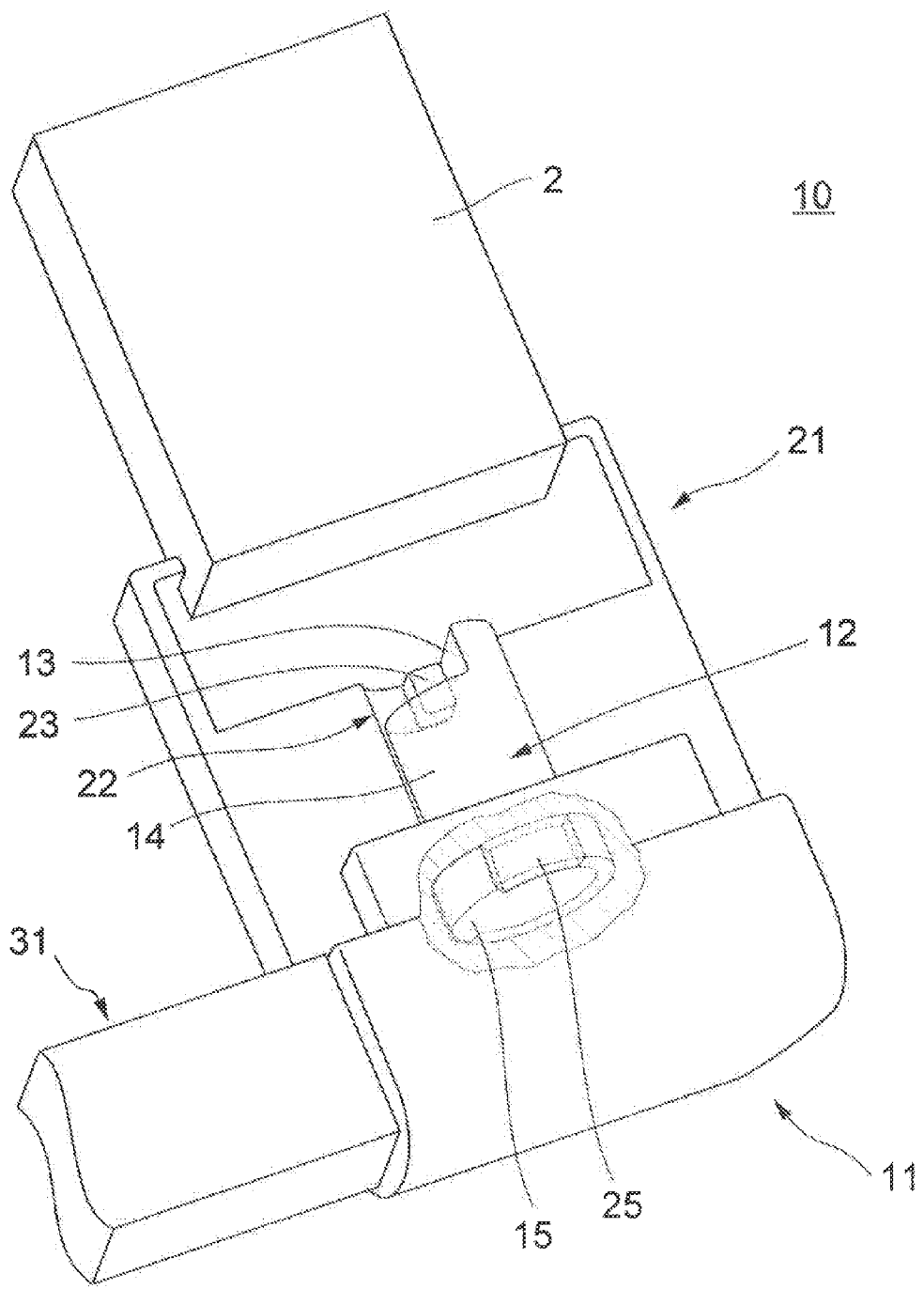
FIG. 1 illustrates a broken sectional view through a peripheral device in an assembled configuration according to an embodiment of the present invention.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

A peripheral device according to embodiments of the present invention can be used in combination with computing devices such as personal, notebook and mobile computers, handheld communication devices and so forth to provide additional, complementary or redundant functionality. According to some embodiments, a peripheral device may be configured as a wireless network interface adapter, an image projector, a digital camera or other device, for example. According to embodiments of the present invention, a peripheral device may be detachably operatively connected with the computing device via a predetermined interconnect system, for example a USB™, Firewire™, ExpressCard™, or other interconnect system.

The peripheral device comprises a first portion, a second portion and an operatively connected peripheral device component. The first portion is configured to define an axis of rotation and comprises a first hinge portion including a first protrusion and a second protrusion. The first protrusion is disposed axially separated at a predetermined distance from the second protrusion. The second portion includes a second hinge portion which is operatively interconnected with the first hinge portion to allow the first portion and the second portion to rotate or hinge relative to one another about the axis of rotation between a first angle and a second angle. The first angle and the second angle, at least in part, are defined by the first protrusion and the second protrusion. Depending on the embodiment, the first portion or the second portion is configured for operative interconnection with the computing device, for example, via a USB™, Firewire™, Express Card™ or other interconnect system.

According to embodiments of the present invention, the first portion and the second portion can be rotated relative to one another to allow control of certain aspects of the operational condition of the peripheral device component that may be affected by its orientation yet maintain the peripheral device component in an operational condition. The peripheral device component is configured to provide one or more peripheral device functions as discussed herein. Depending on the embodiment, the peripheral device component is configured to provide one or more of a wireless network adapter, image projector, digital camera, directional microphone system or other functions.

According to some embodiments of the present invention, the first protrusion and the second protrusion are disposed on the first hinge portion at positions which are axially separated at a predetermined distance, while the first protrusion is substantially opposite the second protrusion in radial position. This arrangement of the first protrusion and the second protrusion can reduce mechanical stress, for example flexural loading exerted on the first portion, when the first hinge portion abuts the second hinge portion via the first protrusion and the second protrusion.

Depending on the embodiment, the first portion or the second portion is configured for operative coupling with an interface of a computing device. The first portion and the second portion are configured to mutually mechanically support their interconnection, while enabling a predetermined amount of relative rotation between the first portion and the second portion. Depending on the embodiment, the first portion or the second portion includes or is operatively connected to the peripheral device component.

FIG. 1 illustrates a broken sectional view of a peripheral device 10 in an assembled configuration according to embodiments of the present invention. The peripheral device 10 comprises a first portion 11, a second portion 21 and a peripheral device component 31. The second portion 21 is configured for operative connection with a computing device (not illustrated) and for this purpose provides an interconnector 2 which 10 can be configured in accordance with a predetermined interconnect system. The first portion 11 comprises a first hinge portion 12. The area around the first hinge portion 12 of the assembled configuration of the peripheral device 10 is illustrated in greater detail in FIG. 2.

First Portion

Figure 2:
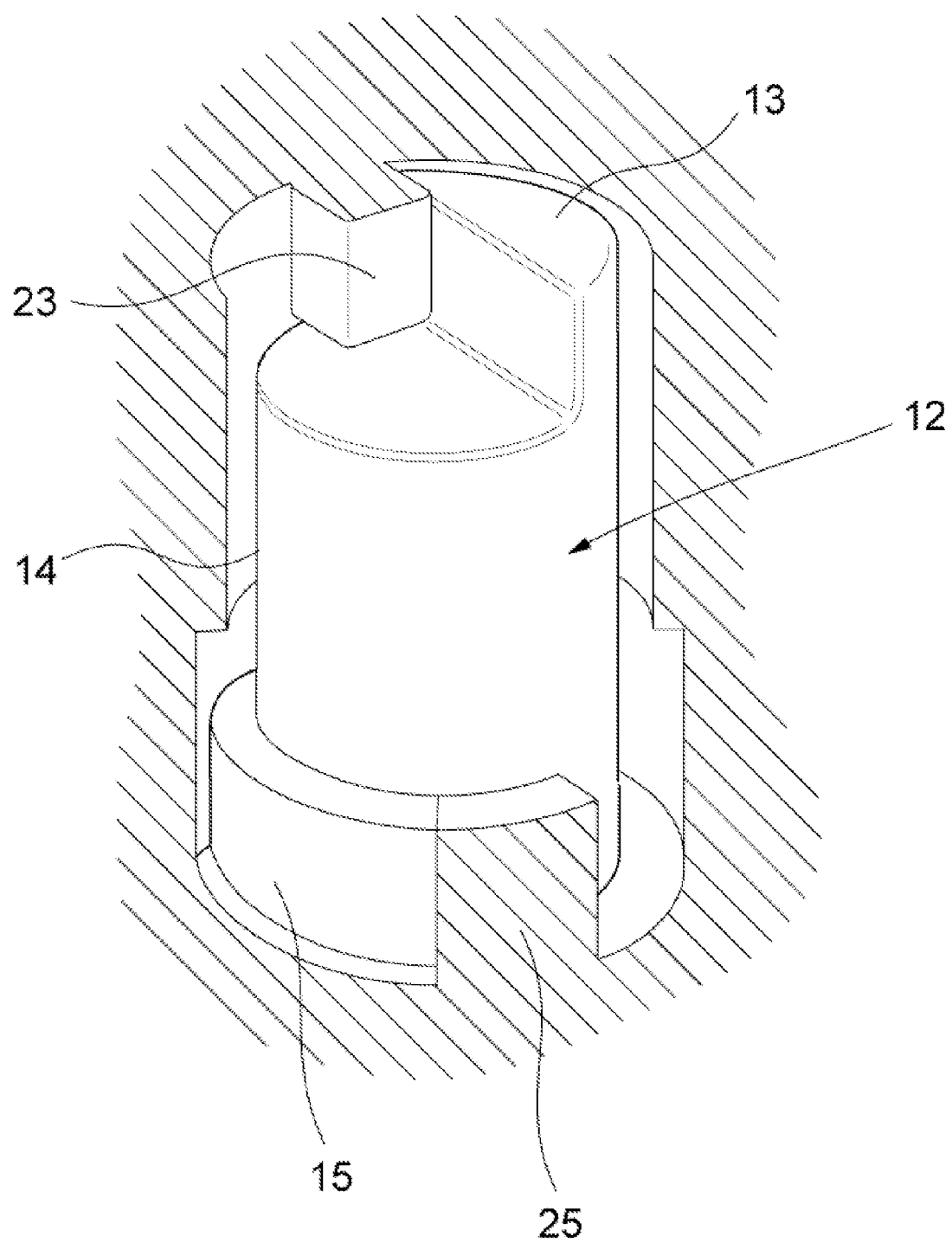
FIG. 2 illustrates a detailed view of a portion of the peripheral device of FIG. 1.

As illustrated in FIG. 1 and FIG. 2, and in accordance with embodiments of the present invention, the first portion 11 includes a first hinge portion 12, which comprises an elongate member 14 defining an axis of rotation, a first protrusion 13 and a second protrusion 15. The first protrusion 13 is disposed axially separated, with respect to the axis of rotation, at a predetermined distance from the second protrusion 15. Depending on the embodiment, the elongate member may be integrally formed with the first portion.

Depending on the embodiment, an elongate member may be configured in a substantially tubular format defining a through hole or be configured without a through hole. A through hole may be correspondingly aligned with a passage through the first portion to provide a passage through which one or more wires or other electrical connections can be passed through or between the first portion and the second portion, for example. According to an embodiment, the first portion is configured to provide a number of electrical contacts that are operatively connected with integrally formed electrical wires or other electrical connections that pass through or along the surface of the first portion for interconnecting the first portion and the second portion. Depending on the embodiment, the electrical wires or other electrical connections may be fed through the through hole or cast in the first portion during manufacture thereof. The electrical contacts may be configured to engage corresponding contact elements provided by the second portion or another element of the peripheral device for establishing an electrical connection to and/or from the first portion.

According to some embodiments of the present invention, the first protrusion is disposed on the elongate member substantially diametrically opposite from the second protrusion. Accordingly, contact forces which are generated at the first protrusion and the second protrusion when the first portion and the second portion abut, are substantially equal in magnitude and opposite in direction. Depending on the embodiment, the first protrusion and the second protrusion may be axially offset with respect to the rotational axis of the first hinge portion. In this manner, the flexural loading at the elongate member is determined, at least in part, by the axial offset between the first protrusion and the second protrusion.

In addition, the elongate member can be subject to torsional loading and shear forces. Torsional loading and shear forces can vary within and proximate the elongate member. Flexural loading can vary depending on the angular offset of the first protrusion relative to second protrusion about the axis of rotation. Furthermore, stability of the interconnection between the first portion and the second portion can vary with the length of the elongate member. Depending on the embodiment, flexural loading can be substantially independent of axial distance between the first protrusion and the second protrusion.

According to some embodiments of the present invention, the first protrusion, the second protrusion and the elongate member are integrally shaped with the first portion. The first protrusion protrudes from the elongate member at a predetermined position, for example, proximate an end of the elongate member. The first protrusion may have a radially protruding sectored cylindrical or prismatic shape or other format or shape extending within a predetermined angular range within a plane perpendicular to the axis of rotation and having a predetermined height parallel to the axis of rotation.

According to an embodiment of the present invention, the second protrusion and the first hinge portion are integrally shaped and formed. The second protrusion may protrude at a predetermined position from the first hinge portion, for example, proximate an end of the elongate member. According to an embodiment of the present invention, the first protrusion and the second protrusion are disposed at opposite ends of the elongate member. According to an embodiment, the second protrusion may protrude axially along the axis of rotation. According to another embodiment, the second protrusion protrudes radially from the axis of rotation. The second protrusion may have a sectored cylindrical or prismatic shape or other format or shape extending within a predetermined angular range within a plane perpendicular to the axis of rotation and having a predetermined height parallel to the axis of rotation. According to embodiments, the first and second protrusions have a predetermined relative angular alignment about the axis of rotation. For example, the first protrusion may be opposite or otherwise disposed on the first hinge portion relative to the second protrusion. According to an embodiment of the present invention, the second protrusion is integrally formed as an axial protrusion of a portion of the elongate member.

According to an embodiment of the present invention, the first hinge portion is configured to define a groove. The groove may be disposed around an outer surface of the elongate member for accommodating an axial securing system for resiliently retaining a predetermined axial position between the first portion to the second portion, when the first portion and the second portion are operatively connected. According to an embodiment to the present invention, the axial securing system comprises one or more engagement elements for engaging the groove, for example one or more elastically deformable open or closed ring elements, one or more resiliently biased pins or cams or the like. The axial securing system may be configured to be provided by the second hinge portion or be configured as an additional component of the peripheral device. According to an embodiment of the present invention, the axial securing system is configured to be mechanically retained by the first hinge portion and the second hinge portion when the first portion and the second portion have been mechanically interconnected.

According to an embodiment of the present invention, the first hinge portion is configured to define a plurality of depressions disposed along the circumference of the outer surface of the elongate member. The depressions may be formed to resiliently engage a rotational retention mechanism for resiliently retaining a predetermined number of rotational configurations of the first portion relative to the second portion. The rotational retention mechanism may be part of the peripheral device and comprise one or more spring biased balls that can operatively engage the plurality of depressions in predetermined angular orientations of the first hinge portion relative to the second hinge portion and thereby retain the first portion in one or more corresponding orientations relative to the second portion. According to an embodiment, the rotational retention mechanism is configured as a friction hinge. According to an embodiment of the present invention, the rotational retention mechanism is configured to be mechanically retained by the first hinge portion and the second hinge portion once the first portion and the second portion have been mechanically interconnected.

Second Portion

As illustrated in FIG. 1 and FIG. 2, and in accordance with embodiments of the present invention, the second portion 21 defines a second hinge portion 22, which is configured to mate with the elongate member 14 and enable rotation of the second portion 21 relative to the first portion 11 within predetermined angles. The area around the second hinge portion 22 is illustrated in greater detail in FIG. 2. The second hinge portion 22 is configured to provide a third protrusion 23 and a fourth protrusion 25, which are configured to abut the first protrusion 13 and the second protrusion 15 at predetermined orientations of the first portion 11 and the second portion 21. FIG. 1 and FIG. 2 illustrate one of two orientations of the first portion relative to the second portion with abutting corresponding protrusions.

According to embodiments of the present invention, the second portion is configured to operatively interconnect with the first portion via the first hinge portion and the second hinge portion. The second hinge portion is configured to define an opening that can be mated with the first hinge portion of the first portion, for example, through a combination of axial and rotational movements. Depending on the embodiment, the second portion may comprise one integrally shaped, or two or more mechanically matching components, each of which may be integrally shaped. Depending on the embodiment, two or more mechanically matching components of a correspondingly configured second portion may be configured for releasable or destructible interconnection. For example, mechanically matching components may be interconnected using rivets, screws, or releasable engagement elements integrally shaped with the mechanically matching components, or by gluing or welding, or in other manner, for example. In some embodiments, the opening of the second portion is configured to mate and interconnect with the elongate member of the first portion.

Depending on the embodiment, the third protrusion may be formed in combination with a first recess (not illustrated). The first recess may be formed by the opening or configured within the opening, for example. Accordingly, the first recess is configured so that the first protrusion may move freely within the first recess unless the first protrusion engages one or more predetermined abutting surfaces of the third protrusion at corresponding ends of the first recess. These surfaces may abut at a first predetermined angle when the first portion and the second portion are operatively connected and positioned at a particular orientation relative to one another.

According to some embodiments of the present invention, the second hinge portion is configured to provide a fourth protrusion. According to an embodiment, the fourth protrusion is formed in combination with a second recess. Accordingly, the second recess may be formed by the opening or within the opening, for example. According to another embodiment of the present invention, the second recess is configured so that the second protrusion may move freely within the second recess unless the second protrusion engages one or more predetermined abutting surfaces of the fourth protrusion. These surfaces may abut at a second predetermined angle when the first portion and the second portion are operatively connected and positioned at a particular relative orientation to one another.

According to an embodiment of the present invention, the first predetermined angle and the second predetermined angle are substantially the same, when the first protrusion engages an abutting surface of the third protrusion, the second protrusion also engages an abutting surface of the fourth protrusion. According to an embodiment of the present invention, the first and the second protrusion engage the abutting surfaces of the corresponding third and fourth recess at two different angles as determined by the orientation of the first portion relative to the second portion.

The first portion, the second portion and/or another portion of the peripheral device may comprise predetermined material, for example, a plastic resin, a metal or an adequate compound material. The material may be selected to provide predetermined cost, mechanical, magnetic, dielectric, electrical or thermal properties. Portions of the peripheral device may be manufactured by die casting or other suitable processes as would be readily understood by a person skilled in the art.

According to some embodiments of the present invention, the rotational functionality of the first portion relative to the second portion has a particular life span which can at least in part, be predetermined based on an approximate number of reconfiguration operations that can lead to failure of the operative connection between the first and second portion. For example, the approximate number of reconfiguration operations may be determined by a number of aspects including effects of rotational operations of the first portion relative to the second portion on the life time of one or more wires that may be fed from the second portion into or through the first portion, the materials used to form the first hinge portion and the second hinge portion and the geometrical configuration of the first hinge portion and the second hinge portion in combination. Other aspects may include torsion, shear, bending and/or other forces imposed on the rotational hinge formed by an operative connection of the first hinge portion and the second hinge portion during reconfiguration operations which can exert stress and strain on at least portions of the first portion and the second portion. One or more of these aspects may determine the size and format of the first hinge portion and the second hinge portion, the first, second, third and/or fourth protrusion, and/or the one or more materials used to form these elements, for example. One or more of these aspects may further affect the range of relative rotation between the first portion and second portion of the peripheral device as defined by the first and second angle.

According to embodiments of the present invention, the first protrusion and the second protrusion are disposed at locations which are axially separated about the axis of rotation. In this manner the bending stresses induced in the first hinge portion can be reduced, as forces resulting from the relative rotation of the first portion and the second portion are being applied at multiple positions along the length of the first hinge portion.

According to an embodiment of the present invention, the first portion and/or the second portion are each formed as an integral component. According to some embodiments of the present invention, the first and/or second portion are each formed from two or more elements, wherein these elements may be configured for assembly by providing a detachable mechanical engagement, for example, by providing snap-in elements formed of a resiliently deformable material that can mutually engage the two or more elements to form the first portion or the second portion. Other connection mechanisms may be use to secure multiple elements together for example, by screws, rivets or the like. The elements may further be configured for permanent mechanical engagement, for example, by soldering, welding, gluing or the like.

Thermal Connectivity and Abutting Hinge Surfaces

According to some embodiments of the present invention, the first portion is configured as a single integrally formed element made from a material with a predetermined thermal conductivity. The first hinge portion may be configured to provide a first abutting surface for abutting a second abutting surface provided by the second hinge portion of the peripheral device. According to an embodiment of the present invention, the first abutting surface is formed having a conical shape, while the second abutting surface is configured as the reciprocal shape thereby enabling contact substantially between the entire first abutting surface and the second abutting surface. According to embodiments of the present invention, the first abutting surface and second abutting surface are biased into engagement by a biasing element, for example a spring, elastomeric element or other biasing element. For example, through appropriate selection of the biasing element, a predetermined frictional contact between the first and second abutting surfaces may be provided, thereby providing an impediment to the relative rotation between the first component and the second component. The degree of impediment may be selected such that the first and second portions do not rotate relative to each other solely due to their weight.

According to some embodiments of the present invention, the first and second abutting surfaces may be configured to provide a predetermined thermal conductivity when the first abutting surface and the second abutting surface are biased against each other at a predetermined force and/or pressure. As would be readily understood, the area of the abutting surfaces and the material of manufacture providing the surfaces can be selected to achieve a desired level of thermal conductivity across the first and second abutting surfaces.

Biasing the first abutting surface against the second abutting surface may be used to provide for predetermined thermal dissipation to and/or from and/or through the first portion. Heat may be dissipated, for example, from a portion including components of the peripheral device that generate waste heat during operation such as a baseband amplifier or another component in a wireless adapter. In some embodiments the first and second abutting surfaces can aid in the dissipation of heat generated by a light source, for example when the peripheral device component is a projector.

Peripheral Device Component

According to some embodiments, a peripheral device is configured to emit or receive light or other electromagnetic radiation, or emit or receive sound waves within a predetermined solid angle about a predetermined range of directions by orienting the first or the second portion of the peripheral device. Accordingly, the peripheral device component can provide one or more peripheral device functions. For example, the peripheral device component can provide a wireless network adapter, image projector, camera, speaker or microphone system or the like.

According to an aspect of the present invention, the peripheral device component can be reoriented within the limitations provided for by the first portion and the second portion while maintaining a desired operational condition of the peripheral device component during operation. For example, if the peripheral device component provides a wireless cellular network or other data network adapter including an antenna system, reorientation thereof can affect signal gain and/or intensity and may improve reception of electromagnetic signals and/or aid in better directing signals emitted from the antenna system or control the radiation exposure of a user. Furthermore, if the peripheral device component provides a projector the projected image can be cast within predetermined solid angles without necessarily having to reorient a computing device to which the peripheral device is connected. If the peripheral device component is a camera, images and/or videos into various solid angles can be taken. If the peripheral device component is configured to include a one or more speakers and/or one or more microphones, reorientation thereof can be used to affect directionality of the sound emission and/or reception.

According to some embodiments of the present invention, the peripheral device component can be cooled by dissipating heat to and/or through the first portion and/or the second portion and further dissipated to the computing device. Heat may be dissipated, for example, from one or more portions of the peripheral device component such as a baseband amplifier in a wireless adapter, projector lamp in a projector or one or more other components, for example.

The invention will now be described with reference to a specific example. It will be understood that the example is intended to describe aspects of some embodiments of the invention and is not intended to limit the invention in any way.

EXAMPLE

Figure 3:
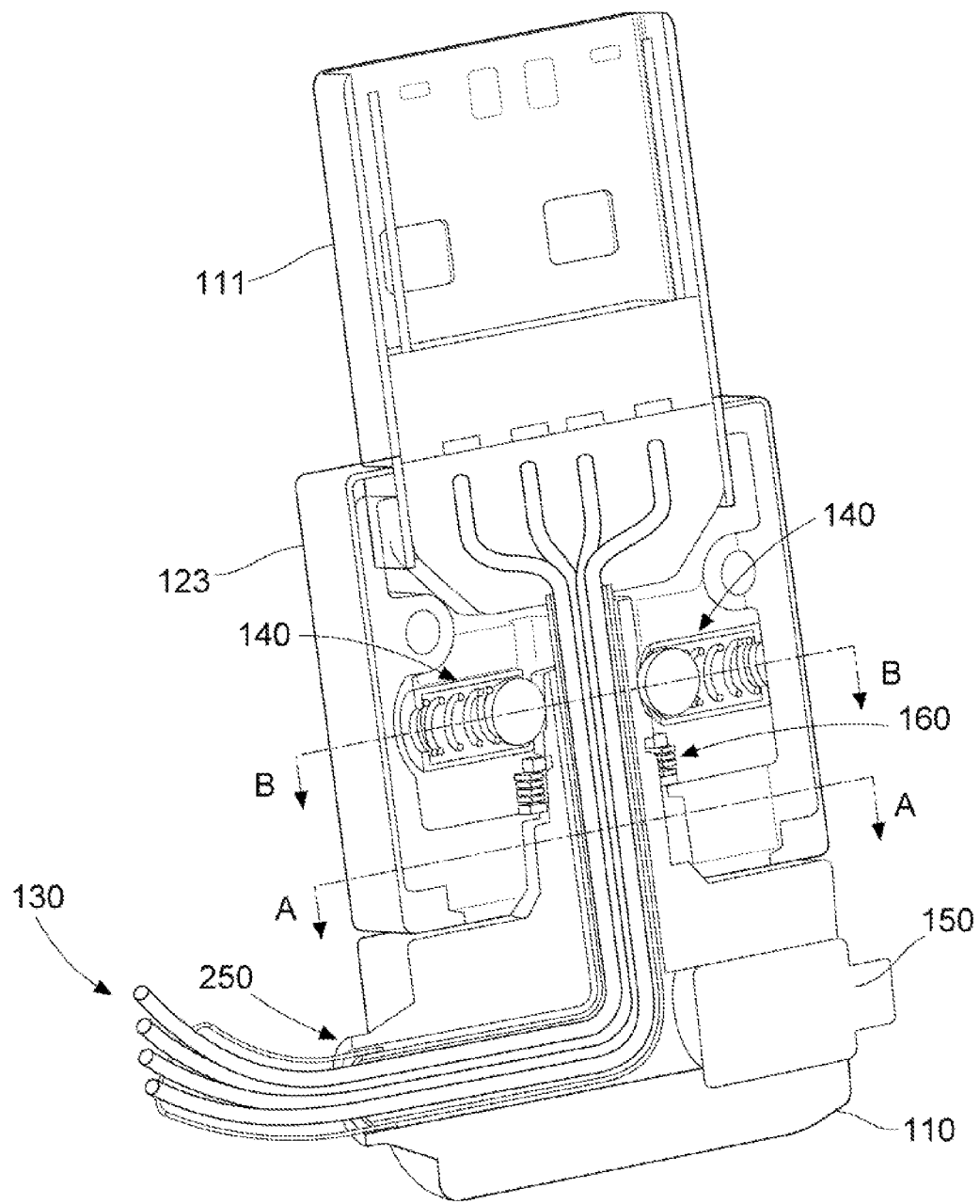
FIG. 3 illustrates a sectional view through a peripheral device according to an embodiment of the present invention.
Figure 5A:
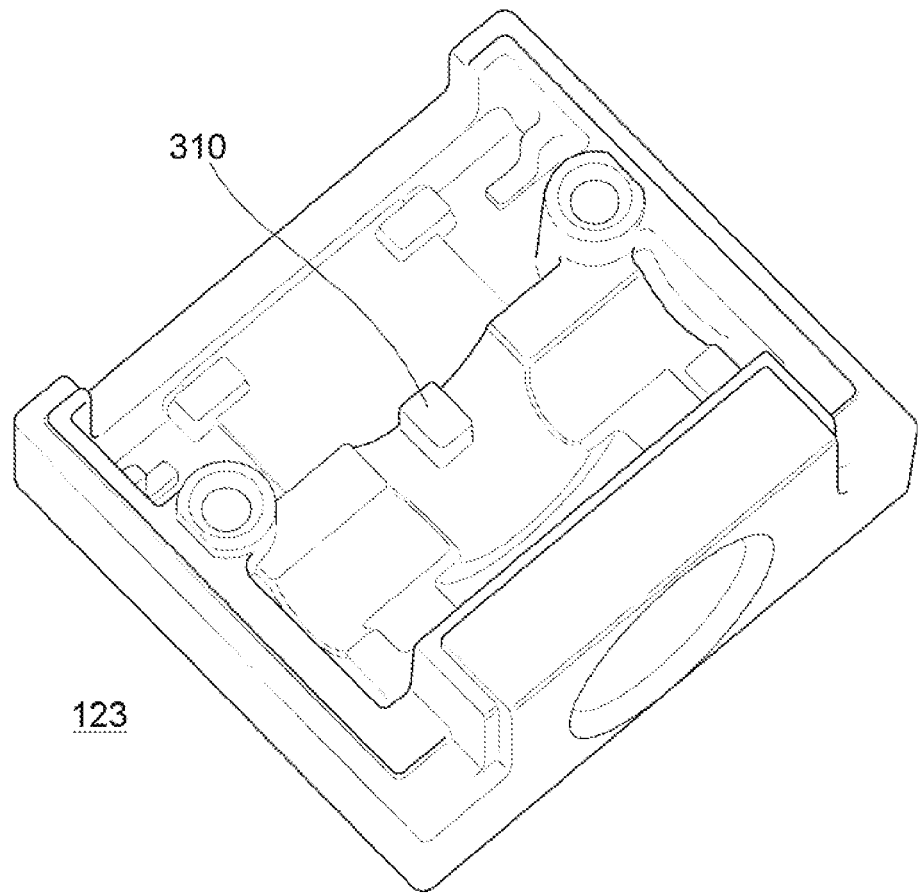
FIG. 5A illustrates a perspective view of a component of a second portion of a peripheral device according to an embodiment of the present invention.
Figure 5B:
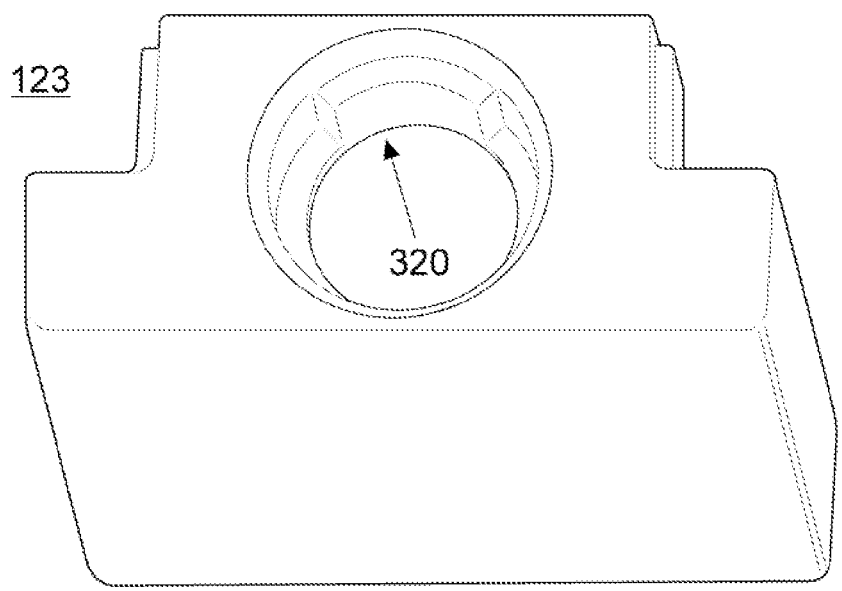
FIG. 5B illustrates another perspective view of the component of the second portion of FIG. 5A.

FIG. 3 illustrates a sectional view of an example peripheral device not including a peripheral device component. The computer port interface of the example peripheral device comprises a USB Series A interconnector 111. It is noted that other types of interconnectors as well as other types of USB interconnectors can be employed in a peripheral device according to embodiments of the present invention. The example peripheral device comprises a first portion 110 operatively connected to a second portion comprising two mechanically matching components 123 and 125. FIGS. 5A and 5B illustrate perspective views of component 123. Component 125 is referenced in FIGS. 6A and 6B as well as in FIG. 7 but is not illustrated separately. Four wires 130 pass through the first portion 110 and are operatively connected to the interconnector 111. It is noted that peripheral devices according to other embodiments may comprise different numbers of wires or other forms of electrical connections.

The example peripheral device further comprises two rotational retention mechanisms 140 and a biasing stub 150.

Figure 4:
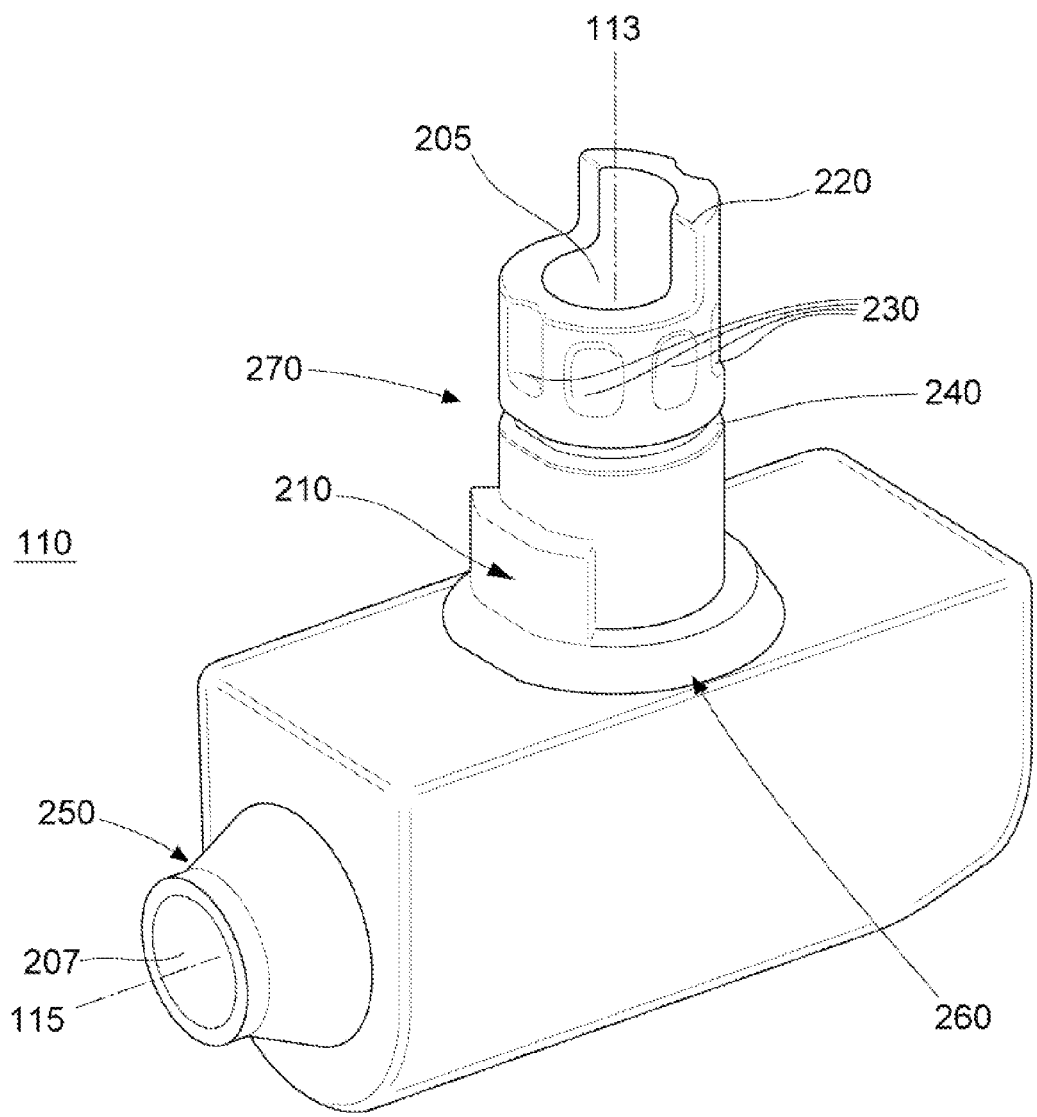
FIG. 4 illustrates a perspective view of a first portion of a peripheral device according to an embodiment of the present invention.

Each rotational retention mechanism 140 comprises a spring biased ball operatively disposed in a cylindrical container. Each rotational retention mechanism 140 is disposed within the second portion formed by the first component 123 and the second component 125 which are adequately formed to accept the rotational retention mechanism 140. The ball of each rotational retention mechanism 140 is configured to be able to engage indentations 230 defined by the first portion 110 as illustrated in FIG. 4. The ball, the spring and the cylindrical container of each rotational retention mechanism may be made from a number of adequate materials as would be readily understood by a person skilled in the art. Two rotational retention mechanisms 140 are disposed opposite of each other within the second portion perpendicular to the axis of rotation defined by the first portion 110 and the second portion, in order to substantially balance shear forces perpendicular to the axis of rotation 113. It is noted that one or another number of rotational retention mechanism 140 may be employed in other example peripheral devices.

The biasing stub 150 is disposed within an adequately formed opening within the first portion 110. The biasing stub 150 is configured to provide a retaining protrusion. The biasing stub 150 may be integrally formed and may comprise an elastic deformable material for biasing another portion of the example peripheral device in combination with the conical surface 250 as described herein against the first portion 110 to provide a rotational operative connection with the other portion (not illustrated).

FIG. 4 illustrates a perspective view of the first portion 110 of the example peripheral device of FIG. 3. The first portion 110 is integrally formed and comprises a elongate member 270 with a tubular configuration defining a through hole 205. The through hole 205 extends into hole 207. A sectional view of through hole 205 and hole 207 is illustrated in FIG. 3. The through hole 205 and the hole 207 of the example peripheral device are substantially aligned with corresponding rotational axes 113 and 115. The first portion 110 may be made from a suitable material, for example, cast from a plastic resin, metal, compound or other material. The material may have a predetermined thermal conductivity. The first portion 110 further comprises a first protrusion 210 and a second protrusion 220. The first protrusion 210 and the second protrusion 220 are disposed proximate at opposite distal ends of the elongate member 270. The elongate member 270 is configured to define a groove 240 and a predetermined number of indentations 230. The groove 240 extends circumferentially around the elongate member 270 and is used for establishing an operative connection with the second portion via an axial securing system 160 as shown in and discussed herein with reference to FIG. 3 and FIG. 7, for example.

In this example, the first protrusion 210 is positioned substantially opposite the second protrusion 220 with respect to rotational axis 113, that is the centre of the first protrusion 210 is positioned substantially 180° from the centre of the second protrusion 220. In this positional configuration of the first protrusion and the second protrusion, contact loads which can be generated at the first protrusion and the second protrusion due to abutments with the second portion can be substantially equal in magnitude and opposite in direction if the peripheral device is adequately configured. In an abutting configuration, the flexural loading within the elongate member 270 substantially linearly increases over the distance from the second protrusion 220 towards the first protrusion 210, subsequently decreasing after the first protrusion 210. The consequent reduction in the flexural loading in the elongate member 270 is a result of the load at the first protrusion 210 being applied in an opposite direction to that of the load that is applied at the second protrusion 220. In addition, the elongate member 270 is also subjected to torsional loading, due to the radial offset of the first protrusion 210 and second protrusion 220 relative to the axis of rotation 113.

The first portion 110 is further configured to provide conical surfaces 260 and 250 for centrically aligning the second portion and/or another portion of the peripheral device about corresponding rotational axes 113 and 115. The rotational axes 113 and 115 of the example peripheral device substantially lie within a plane and intersect one another at a substantially right angle. Depending on the embodiment, the rotational axes 113 and 115 may intersect at other angles. The conical surfaces 250 and/or 260 may be configured to provide a predetermined abutting surface area with predetermined axial slopes to provide a predetermined frictional and/or thermal engagement with the second and/or another portion of the peripheral device when axially biased against each other along the corresponding axes 113 and 115. One or more of the conical surfaces 250 and 260 may be employed for dissipating heat to and/or from and/or through the first portion 110.

FIG. 5A and FIG. 5B illustrate perspective views of the first component 123 of the second portion of the example peripheral device of FIG. 3. It is noted that the second portion may be complemented by the second component 125 (not illustrated separately). The first component 123 is integrally formed and comprises a third protrusion 320 and a fourth protrusion 310, which can respectively engage the first protrusion 210 and the second protrusion 220 of the first portion upon turning of the first portion and the second portion, in an operatively engaged configuration, about the common rotational axis 113. Depending on the embodiment, the third protrusion 320 and/or the fourth protrusion 310 may be provided by the second component 125.

Figure 6A:
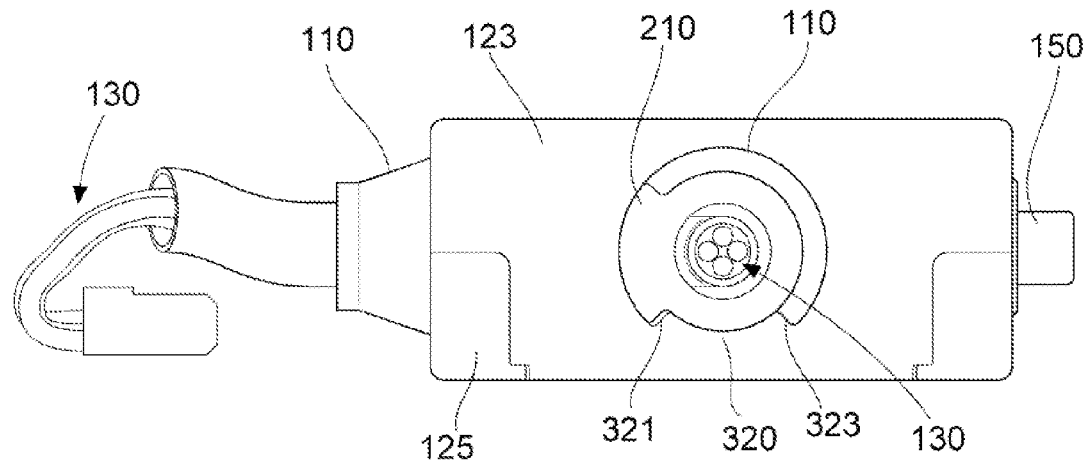
FIG. 6A illustrates a sectional view of the peripheral device of FIG. 3 through a plane defined by line A.
Figure 6B:
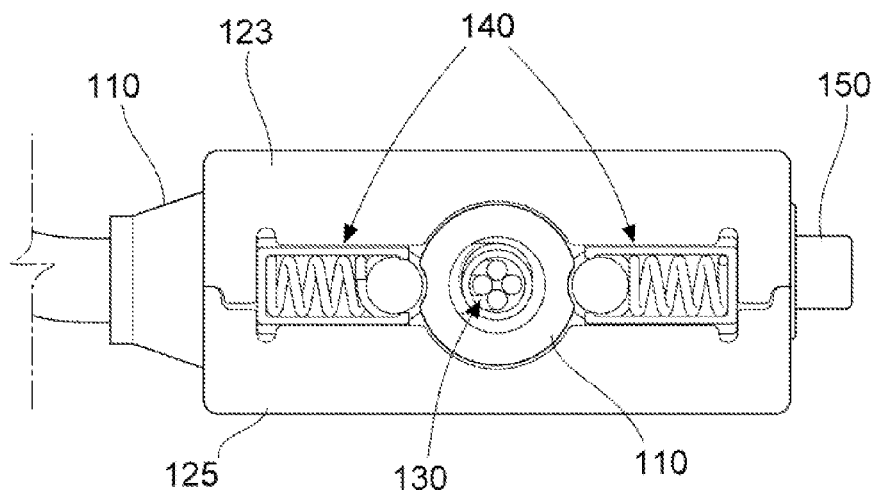
FIG. 6B illustrates a sectional view of the peripheral device of FIG. 3 through a plane defined by line B.

FIG. 6A and FIG. 6B illustrate sectional views of the portions of the peripheral device of FIG. 3 through respective planes indicated by line A and line B as defined in FIG. 3. As can be seen in FIG. 6A the first portion 110 and the first component 123 are illustrated in a substantially abutting configuration wherein corresponding surfaces of the first protrusion 210 and the third protrusion 320 abut at 321. In the example peripheral device the first component 123 of the first component 123 provides the third protrusion 321. Depending on the embodiment, the third protrusion may be provided by the second component. Depending on the relative orientation, the first portion 110 and the first component 123 may be rotated between the abutting configuration illustrated in FIG. 6A and another abutting configuration (not illustrated) wherein corresponding surfaces of the first protrusion 210 and the third protrusion 320 mutually abut at 323. It is noted that the first and second portions of other example peripheral devices may be configured to abut at different relative angles. FIG. 6B illustrates the balls of the rotational retention mechanisms 140 aligned with two corresponding indentations 230 of the first portion. It is noted that in this cross section, only two depressions 230 are illustrated. As can be seen, rotation of the first portion 110 relative to the first component 123 depresses the spring-biased balls and requires overcoming a predetermined torque threshold as determined by at least the geometry and the force exerted by the springs of the rotational retention mechanisms 140.

Figure 7:
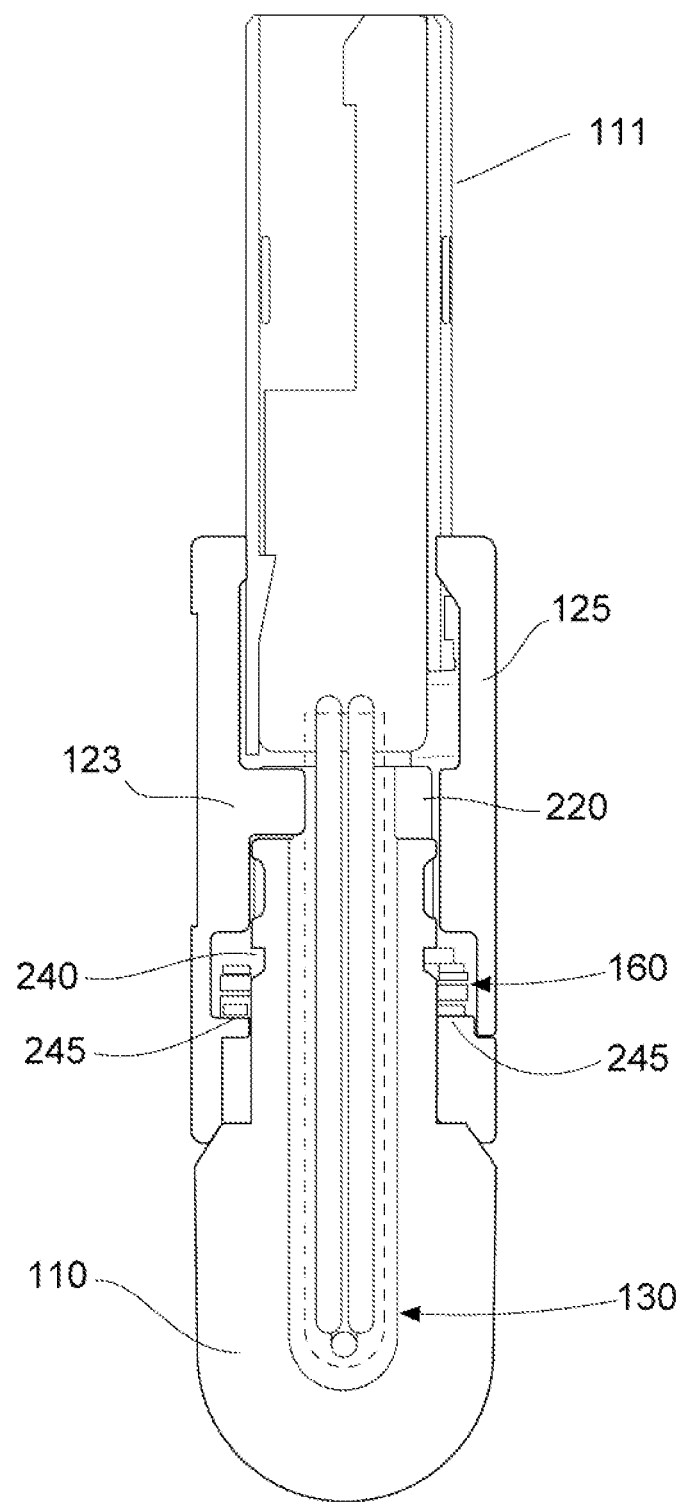
FIG. 7 illustrates another sectional view of the peripheral device of FIG. 3.

FIG. 7 illustrates a sectional view of the example peripheral device of FIG. 3. The sectional view runs along a side of the example peripheral device parallel to the axis of rotation 113 as defined by the first portion 110 and second portion comprising the first component 123 and the second component 125.

As illustrated in FIG. 3 and FIG. 7 the axial securing system 160 operatively connects the first portion 110 via groove 240 and the second portion. The axial securing system 160 resiliently retains a predetermined axial distance between the first portion 110 and the second portion, when the first portion and the second portion are operatively connected. The axial securing system 160 as illustrated comprises one or more engagement elements for engaging the groove, for example an elastically deformable open ring element. The axial securing system 160 is configured to be mechanically retained by the first portion and the second portion once the first portion and the second portion are operatively interconnected. For this purpose, the second portion further comprises a rim 245 for abutting a portion of the axial securing system and operative engagement thereof.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A peripheral device configured for detachable operative interconnection with a computing device, the peripheral device comprising:
   a. a first portion including a first hinge portion, which defines an axis of rotation, the first hinge portion having a length and comprises a first protrusion and a second protrusion, the first protrusion disposed axially separated along the length at a predetermined distance from the second protrusion;
   b. a second portion including a second hinge portion which is operatively interconnected with the first hinge portion to allow the first portion and the second portion to rotate relative to one another about the axis of rotation between a first angle and a second angle; said first angle and said second angle at least in part defined by said first protrusion and said second protrusion; and
   c. an operatively connected peripheral device component.

2. The peripheral device according to claim 1, wherein the first portion is configured to operatively interconnect with the computing device.

3. The peripheral device according to claim 1, wherein the second portion is configured to operatively interconnect with the computing device.

4. The peripheral device according to claim 1, wherein the first portion comprises an elongate member defining the axis of rotation.

5. The peripheral device according to claim 4, wherein the elongate member and the first protrusion are integrally formed.

6. The peripheral device according to claim 4, wherein the elongate member and the second protrusion are integrally formed.

7. The peripheral device according to claim 1, wherein the first protrusion protrudes radially away from the axis of rotation.

8. The peripheral device according to claim 4, wherein the elongate member has a tubular configuration and wiring running through the elongate member.

9. The peripheral device according to claim 1, wherein the second protrusion protrudes radially away from the axis of rotation.

10. The peripheral device according to claim 1, wherein the second protrusion protrudes axially from a distal end of the first portion.

11. The peripheral device according to claim 1, wherein the first portion has a first abutting surface and the second portion has a second abutting surface, and said first abutting surface and said second abutting surface are resiliently biased against one another.

12. The peripheral device according to claim 1, wherein the first abutting surface and the second abutting surface are configured to provide a predetermined thermal conductivity and, when the first abutting surface and the second abutting surface are abutting, provide an interface with a predetermined thermal connectivity between the first portion and the second portion.

13. The peripheral device according to claim 1, wherein the second portion defines a third protrusion and a fourth protrusion.

14. The peripheral device according to claim 13, wherein said third protrusion is configured to at least in part abut said first protrusion at least at one of said first angle and said second angle.

15. The peripheral device according to claim 13, wherein said fourth protrusion is configured to at least in part abut said second protrusion at least at one of said first angle and said second angle.

16. The peripheral device according to claim 1, wherein the first portion and the second portion can be operatively interconnected by a combination of axial and rotational movements.

17. The peripheral device according to claim 1, further including an axial securing system for resiliently retaining a predetermined axial distance between the first portion and the second portion.

18. A peripheral device configured for detachable operative interconnection with a computing device, the peripheral device comprising:
   a. a first portion including a first hinge portion, which defines an axis of rotation, and comprises a first protrusion and a second protrusion, the first protrusion disposed axially separated at a predetermined distance from the second protrusion;
   b. a second portion including a second hinge portion which is operatively interconnected with the first hinge portion to allow the first portion and the second portion to rotate relative to one another about the axis of rotation between a first angle and a second angle; said first angle and said second angle at least in art defined b said first protrusion and said second protrusion; and c. an operatively connected peripheral device component;
   wherein the first hinge portion defines one or more indentations at an outer surface of the first hinge portion, the peripheral device further comprising a rotational retention mechanism including one or more resiliently biased balls configured to engage one or more of the indentations.

19. The peripheral device according to claim 18, wherein the resiliently biased balls are spring biased.

20. The peripheral device according to claim 18, wherein the rotational retention mechanism is configured to allow rotation of the first portion relative to the second portion when a predetermined rotational momentum between the first portion and the second portion is exceeded.

21. A peripheral device configured for detachable operative interconnection with a computing device, the peripheral device comprising:

a. a first portion including a first hinge portion, which defines an axis of rotation, and comprises a first protrusion and a second protrusion, the first protrusion disposed axially separated at a predetermined distance from the second protrusion;

b. a second portion including a second hinge portion which is operatively interconnected with the first hinge portion to allow the first portion and the second portion to rotate relative to one another about the axis of rotation between a first angle and a second angle; said first angle and said second angle at least in art defined b said first protrusion and said second protrusion; and c. an operatively connected peripheral device component;

wherein the first hinge portion includes a groove and the second portion includes a rim for operatively engaging the axial securing system.

* * * * *